H. H. McMASTER.
Washing-Machine.

No. 203,062. Patented April 30, 1878.

Witnesses:
P. B. Turpin.
A. P. Lacey

Inventor:
Henry H. McMaster
by W. Burris
Attorney

UNITED STATES PATENT OFFICE.

HENRY H. McMASTER, OF JAMESTOWN, PENNSYLVANIA.

IMPROVEMENT IN WASHING-MACHINES.

Specification forming part of Letters Patent No. 203,062, dated April 30, 1878; application filed March 11, 1878.

*To all whom it may concern:*

Be it known that I, HENRY H. McMASTER, of Jamestown, in the county of Mercer and State of Pennsylvania, have invented certain new and useful Improvements in Washing-Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1:
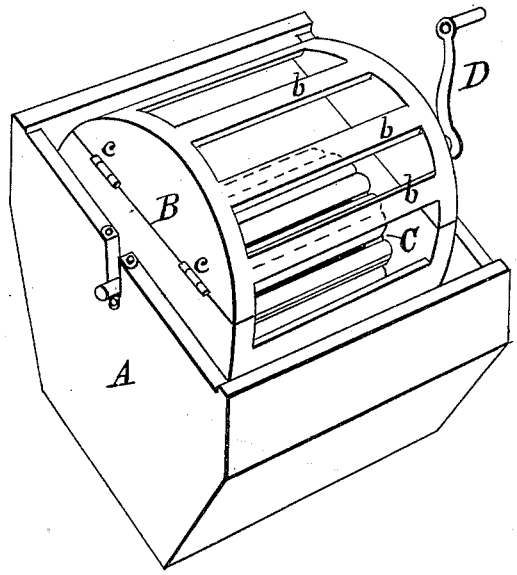
Figure 2:
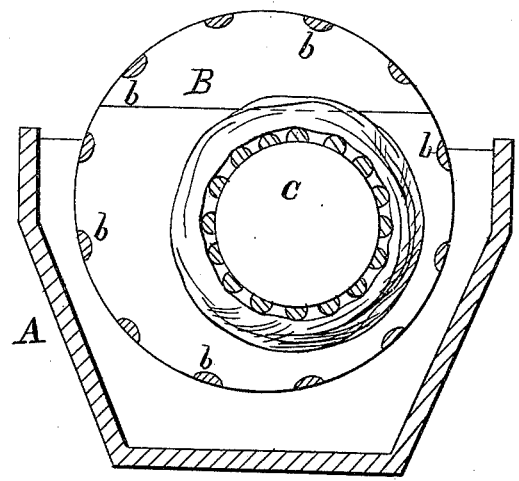

Figure 1 is a perspective view. Fig. 2 is a vertical section.

My invention relates to cylinder washing-machines; and it consists of a cylinder adjusted to revolve in a water-tank, and provided with a loose roller having free motion within the cylinder, the sides of which are formed of slats, arranged a sufficient distance apart to allow the roller to drop with some force from one slat to another, to facilitate the cleansing of the clothes, as hereinafter fully described.

A is the water-tank. B is a cylinder, provided with journals attached to the ends of the cylinder, and adjusted to revolve on bearings in the sides of the tank. The sides of the cylinder are formed of the slats *b*, arranged about six inches apart, fastened to the disks forming the ends of the cylinder, which are divided into two sections, and hinged together at *c*, to allow ready access to the interior of the cylinder to insert and remove the roller carrying the clothes.

C is an inner roller, the sides of which are formed of rungs or semicircular slats fastened to disks forming the ends of the roller. This roller is made the proper size to allow it to have free motion within the cylinder. The clothes to be cleansed are wrapped around or properly placed on the roller, and fastened by cords or other suitable devices. The tank being supplied with water, and the roller having the clothes adjusted on it placed within the cylinder, it is revolved by the crank D, the roller and clothes dropping with some force from one slat to another, thus facilitating the process of cleansing the clothes.

What I claim as new, and desire to secure by Letters Patent, is—

The combination of the slatted cylinder B, journaled in the tank A, with the slatted roller C, having free motion in the cylinder, the slats of the latter being arranged at sufficient distances apart to allow the inner roller to drop from one slat to the next when the cylinder is revolved, substantially as and for the purposes described.

In testimony that I claim the foregoing as my own invention I affix my signature in presence of two witnesses.

HENRY H. McMASTER.

Witnesses:
W. C. BENINGER,
F. M. TIERNAN.